(12) United States Patent
Shinkar et al.

(10) Patent No.: US 8,214,597 B2
(45) Date of Patent: Jul. 3, 2012

(54) CACHE TENTATIVE READ BUFFER

(75) Inventors: Alex Shinkar, Rishon-Lezion (IL);
Nahum N. Vishne, Elad (IL)

(73) Assignee: LSI Corporation, Milpitas, CA (US)

( * ) Notice: Subject to any disclaimer, the term of this patent is extended or adjusted under 35 U.S.C. 154(b) by 1038 days.

(21) Appl. No.: 12/164,342

(22) Filed: Jun. 30, 2008

(65) Prior Publication Data
US 2009/0327614 A1 Dec. 31, 2009

(51) Int. Cl.
*G06F 12/00* (2006.01)
(52) U.S. Cl. ........................ 711/127; 711/137
(58) Field of Classification Search .................. None
See application file for complete search history.

(56) References Cited

U.S. PATENT DOCUMENTS

| 6,675,263 | B2 * | 1/2004 | Anderson et al. | 711/137 |
| 6,895,475 | B2 * | 5/2005 | Volpe et al. | 711/137 |
| 2003/0018857 | A1 * | 1/2003 | Anderson et al. | 711/137 |
| 2004/0064649 | A1 * | 4/2004 | Volpe et al. | 711/137 |

* cited by examiner

*Primary Examiner* — John Lane
(74) *Attorney, Agent, or Firm* — Christopher P. Maiorana, PC

(57) ABSTRACT

An apparatus having a cache and a circuit. The cache may store old lines having old instructions. The circuit may (i) receive a first read command, (ii) fetch-ahead a new line having new instructions into a buffer sized to hold a single line, (iii) receive a second read command, (iv) present through a port a particular new instruction in response to both (a) a cache miss of the second read command and (b) a buffer hit of the second read command and (v) overwrite a particular old line with the new line in response to both (a) the cache miss of the second read command and (b) the buffer hit of the second read command such that (1) the first new line resides in all of the cache, the buffer and the memory and (2) the particular old line resides only in the memory.

20 Claims, 4 Drawing Sheets

CACHE TENTATIVE READ BUFFER

FIELD OF THE INVENTION

The present invention relates to instruction caches generally and, more particularly, to a method and/or apparatus for implementing a cache tentative read buffer.

BACKGROUND OF THE INVENTION

A conventional program cache is a memory bank that bridges main memory and a central processing unit (CPU). The program cache is faster than the main memory and so allows instructions to be executed by the CPU at higher speeds. Instructions are transferred from the main memory to the program cache in blocks (i.e., cache lines). The instructions are usually transferred to the program cache ahead of time using a look-ahead technique. The more sequential the instructions are in the routine being executed, the greater the chance that a next instruction will already be in the program cache, resulting in better performance.

Referring to FIG. 1, a block diagram of a conventional processor system 10 is shown. The system 10 has a CPU 12 coupled to a program cache 14. The program cache 14 communicates with a main memory 16 via a system bus 18. The main memory 16 stores instructions and data used by the CPU 12. The program cache 14 is commonly referred to as a level 1 (L1) cache.

A cache hit refers to a successful attempt by the CPU 12 to read an instruction from the cache 14. When a cache hit occurs, the requested instruction is transferred from the program cache 14 to the CPU 12. A resulting transfer latency is designed to be short in order to avoid stalling the CPU 12.

A cache miss refers to a failed attempt by the CPU 12 to read an instruction from the cache 14. When a cache miss occurs, an appropriate instruction line is transferred from the main memory 16 to the program cache 14. The "missed" instruction is then read by the CPU 12 from the program cache 14. An access latency caused by transferring the instruction line from the main memory 16 across the system bus 18 to the program cache 14 is longer than the latency in transferring the instruction from the program cache 14 to the CPU 12. In most cases, the CPU 12 will stall while waiting for the requested instruction to become available in the program cache 14.

Fetch-ahead is a feature for improving a performance of the program cache 14. While the CPU 12 is executing a sequence of instructions in a software code, if the next instruction line is not already in the program cache 14, the next instruction line is fetched from the main memory 16 after a program read access. The fetch-ahead feature usually improves cache hit performance due to linearity of the program-flow in the code. In many cases, the next instruction requested by the CPU 12 is sequential to the instruction currently being executed. If the next instruction is not inside the program cache 14, a program-cache controller operating in the background moves the next instruction line into the program cache 14 without stalling the CPU 12.

The fetch-ahead feature improves performance when the software code is linear. However, when a change-of-program-flow exists in the code, the fetch-ahead feature can reduce the cache performance thereby causing a long stall in the CPU 12. In the case of a change-of-program-flow, a new instruction line fetched by the fetch-ahead feature is not used by the CPU 12. Instead, the change-in-program-flow forces a different instruction line to be read from the main memory 16. Furthermore, the different instruction line might overwrite an existing instruction line that is subsequently requested by the CPU 12. As a result, the fetch-ahead feature can "dirty" the program cache 14 with unwanted instruction lines thus reducing the overall program cache performance.

A conventional level 2 (L2) cache situated between the program (L1) cache 14 and the main memory 16 can be used to reduce the access latency due to a cache miss in the L1 cache. An L2 cache is commonly slower than an L1 cache but faster than the main memory. Therefore, transferring a missing instruction line from the L2 cache to the L1 cache takes less time than fetching the missing instruction line from the main memory 16. However, if the L1/L2 cache is an exclusive arrangement (each line exists in only one of the caches), an unused line fetched-ahead will propagate through the L2 cache to the L1 cache making the L1 cache dirty. If the L1/L2 cache is an inclusive arrangement (each line exists in both of the caches), the unused line will pollute both the L1 cache and the L2 cache.

SUMMARY OF THE INVENTION

The present invention concerns an apparatus generally having a cache and a circuit. The cache may be configured to store a plurality of old lines, each of the old lines comprising a plurality of old instructions. The circuit may have a buffer sized to hold a single line at a time. The circuit may be configured to (i) receive from a processor a first read command, (ii) fetch-ahead a first new line from a memory into the buffer in response to the first read command, the first new line comprising a plurality of new instructions, (iii) receive from the processor a second read command, (iv) present through a port to the processor a particular one of the new instructions in response to both (a) a cache miss of the second read command among the old instructions and (b) a buffer hit of the second read command among the new instructions and (v) overwrite a particular one of the old lines with the first new line in response to both (a) the cache miss of the second read command and (b) the buffer hit of the second read command such that (1) the first new line resides in all of the cache, the buffer and the memory and (2) the particular old line resides only in the memory.

The objects, features and advantages of the present invention include providing a method and/or apparatus for implementing a cache tentative read buffer that may (i) avoid polluting a level 1 instruction cache with unused fetch-ahead instructions, (ii) provide temporary low access latency storage of a fetch-ahead instruction line, (iii) overwrite unused fetch-ahead instruction lines with newer instruction lines and/or (iv) copy used fetch-ahead instruction lines into the level 1 cache to accommodate repeated accesses.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally eliminates the disadvantages of a fetch-ahead feature polluting a level 1 (L1) cache. When a fetch-ahead instruction is requested by a central processing unit (CPU), the fetch-ahead instruction may be presented to the CPU and an associated fetch-ahead line may be written into the L1 cache. When the fetch-ahead instruction is not requested by the CPU (e.g., because of a change-of-program flow), the fetch-ahead line may not be written into the L1 cache thus preventing the L1 cache from becoming dirty.

Figure 1:
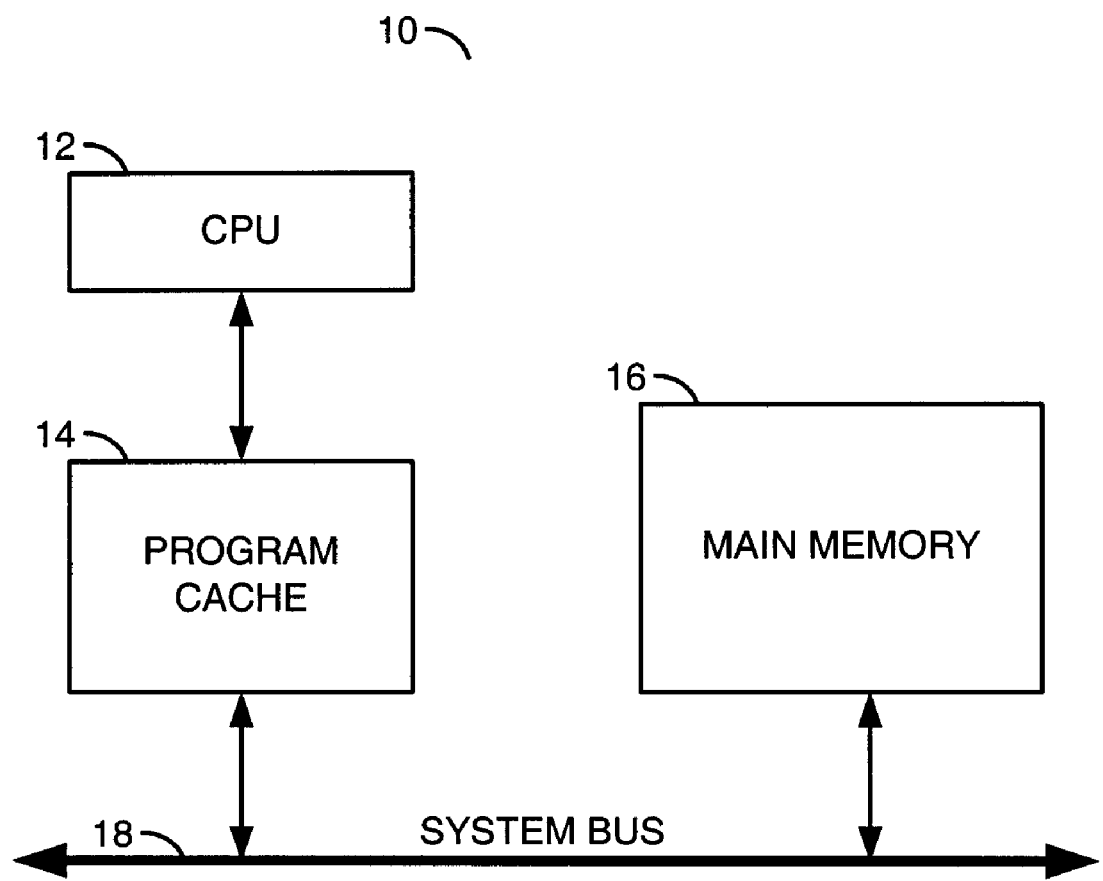
FIG. 1 is a block diagram of a conventional processor system.
Figure 2:
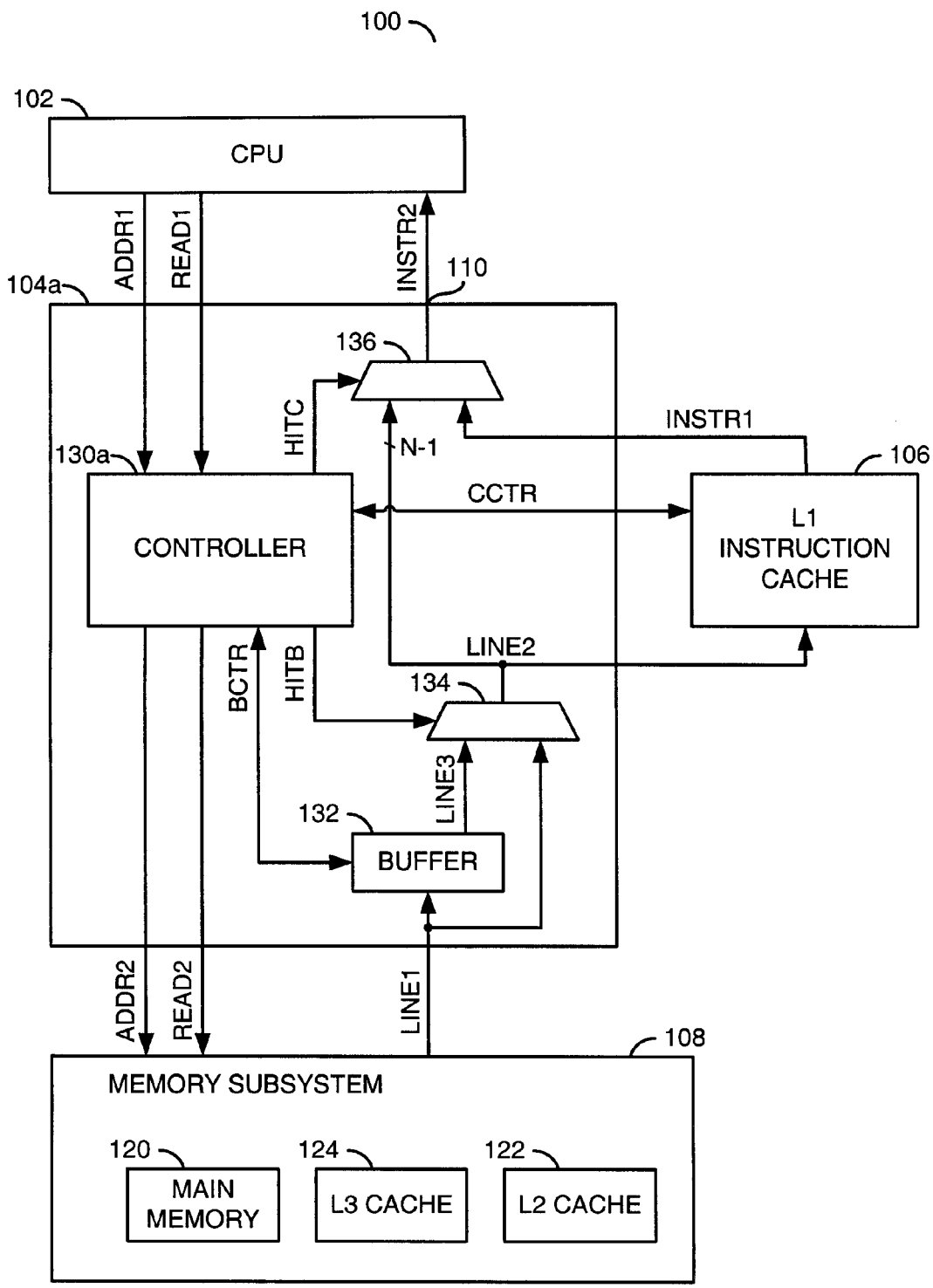
FIG. 2 is a block diagram of a first example implementation of an apparatus in accordance with a preferred embodiment of the present invention.

Referring to FIG. 2, a block diagram of a first example implementation of an apparatus 100 is shown in accordance with a preferred embodiment of the present invention. The apparatus (or system) 100 generally comprises a circuit (or module) 102, a circuit (or module) 104a, a circuit (or module) 106 and a circuit (or module) 108.

A signal (e.g., ADDR1) may be generated by the circuit 102 and presented to the circuit 104a. The circuit 102 may generate and present a signal (e.g., READ1) to the circuit 104a. A signal (e.g., CCTR) may be exchanged between the circuit 104a and the circuit 106.

A signal (e.g., ADDR2) may be generated by the circuit 104a and presented to the circuit 108. The circuit 104a may also generate a signal (e.g., READ2) that is presented to the circuit 108. The circuit 108 may generate and present a signal (e.g., LINE1) to the circuit 104a. The circuit 104a may generate and present a signal (e.g., LINE2) to the circuit 106. The circuit 106 may generate and present a signal (e.g., INSTR1) to the circuit 104a. A signal (e.g., INSTR2) may be generated by the circuit 104a and presented to the circuit 102 through a port (or interface) 110.

The circuit 102 may be implemented as a central processing unit. The circuit 102 may be operational to execute instructions stored in the circuit 108 as part of software programming (or code). The circuit 102 may control the signal READ1 and the signal ADDR1 to command the circuit 104a to provide a next instruction in the signal INSTR2.

The circuit 104a generally implements a program cache control circuit. The circuit 104a may be operational to provide cache control of the circuit 106, cache hit/miss detection, fetch-ahead operations and buffering of the instructions received from the circuit 108 via the signal LINE1. For a fetch-ahead command, the circuit 104a may control the signal READ2 and the signal ADD2 to read the fetch-ahead instruction line from the circuit 108. The circuit 104a generally observes a sequence of read commands received via the signals READ1 and ADDR1 to determine when to fetch-ahead the next set of instruction. In some embodiments, the circuit 102 may command the circuit 104a to initiate a fetch-ahead. The fetch-ahead instruction line may then be held within the circuit 104a until actually requested by the circuit 102. In a case of a cache hit in response to a read command, the requested instruction may be received from the circuit 106 via the signal INSTR1 and presented to the circuit 102 in the signal INSTR2 through the port 110. In the event of a cache miss and a buffer hit on the read command, the requested instruction may be written into the circuit 106 via the signal LINE2 and presented to the circuit 102 via the signal INSTR2. When the read command results in both a cache miss and a buffer miss, the circuit 104a may (i) control the signals READ2 and ADDR2 to obtain the appropriate instruction line from the circuit 108, (ii) provide the requested instruction to the circuit 102 via the signal INSTR2 through the port 110 and (iii) write the instruction line into the circuit 106 via the signal LINE2.

The circuit 106 may be implemented as a level 1 instruction cache. The circuit 106 is generally operational to buffer multiple instruction lines. Each of the instruction lines may include two or more executable instructions. In some embodiments, the circuit 106 may be implemented as a direct-mapped cache. In other embodiments, the circuit 106 may be implemented as an N-way set associative cache, where N is an integer (e.g., 2, 4 or 8). Other cache arrangements may be implemented to meet the criteria of a particular application.

The circuit 108 may be implemented as a memory subsystem. The circuit 108 may be operational to store software programs (or code) and data for use by the circuit 102. In some embodiments, the circuit 108 may comprise a main memory 120 of the apparatus 100. An optional level 2 (L2) cache 122 may be included in the circuit 108. In some embodiments, the L2 cache 122 may also be part of the circuit 104a or the circuit 106. An optional level 3 (L3) cache 124 may be included in the circuit 108.

The circuit 104a generally comprises a circuit (or module) 130a, a circuit (or module) 132, a circuit (or module) 134 and a circuit (or module) 136. The signal ADDR1 and the signal READ1 may be received by the circuit 130a from the circuit 102. The circuit 130a may exchange the signal CCTR with the circuit 106. The circuit 130a may generate and present the signal ADDR2 and the signal READ2 to the circuit 108. The signal LINE1 may be received by the circuit 132 and the circuit 134. A signal (e.g., LINE3) may be generated and presented from the circuit 132 to the circuit 134. The circuit 134 may present the signal LINE2 to the circuit 106 and the circuit 136. The circuit 136 may receive the signal INSTR1 from the circuit 106. The circuit 136 may present the signal ISNTR2 to the circuit 102. A signal (e.g., HITB) may be generated by the circuit 130a and presented to the circuit 134. A signal (e.g., BCTR) may be exchanged between the circuit 130a and the circuit 132. The circuit 130a may also generate a signal (e.g., HITC) that is presented to the circuit 136.

The circuit 130a generally implements a controller. The circuit 130a may be operational to control the signals ADDR2 and READ2 to read instruction lines from the circuit 108 in response to the signals ADDR1, READ1, BCTR and CCTR. The circuit 130a may also determine when to fetch-ahead additional instructions from the circuit 108 before the circuit 102 actually requests such additional instructions. The circuit 130a is also operational to communicate with the circuit 106 via the signal CCTR to determine if a CPU-initiated fetch-ahead request or a read request is already buffered in the circuit 106. The circuit 130a may be further operational to communicate with the circuit 132 via the signal BCTR to determine if a CPU-initiated fetch-ahead request or a read request is already buffered in the circuit 132. Furthermore, the circuit 130a may control the signals HITC and HITB to direct instructions through the circuit 104a.

The circuit 132 may be implemented as a line buffer. The circuit 132 is generally operational to store a single instruction line received via the signal LINE1. The stored instruction line may be presented to the circuit 134 via the signal LINE3 under the control of the signal BCTR. Furthermore, the circuit 132 may be operational to communicate with the circuit 130a to determine if an instruction fetch-ahead operation or an instruction read operation results in a buffer hit or a buffer miss.

The circuit 134 may be implemented as a 2:1 multiplexer. The circuit 134 may be operational to multiplex the signal LINE1 and the signal LINE3 to create the signal LINE2. The circuit 134 is generally controlled by the circuit 130a via the signal HITB. When the signal HITB is asserted (e.g., a buffer hit), the circuit 134 may multiplex the signal LINE3 from the circuit 132 to the circuit 106 for subsequent storage. When the signal HITB is deasserted (e.g., a buffer miss), the circuit 134 may route the signal LINE1 from the circuit 108 to the circuit 106 for subsequent storage.

The circuit 136 may be implemented as an N:1 multiplexer. The circuit 136 is generally operational to multiplex the signal INSTR1 and each instruction within the signal LINE2 to create the signal INSTR2 at the port 110. The circuit 136 may be controlled by the circuit 130a via the signal HITC. When the signal HITC is asserted (e.g., a cache hit), the circuit 136 may route the signal INSTR1 from the circuit 106 to the circuit 102 via the signal INSTR2. When the signal HITC is deasserted (e.g., a cache miss), the circuit 136 may route a portion of the signal LINE2 from the circuit 132 to the circuit 102.

Figure 3:
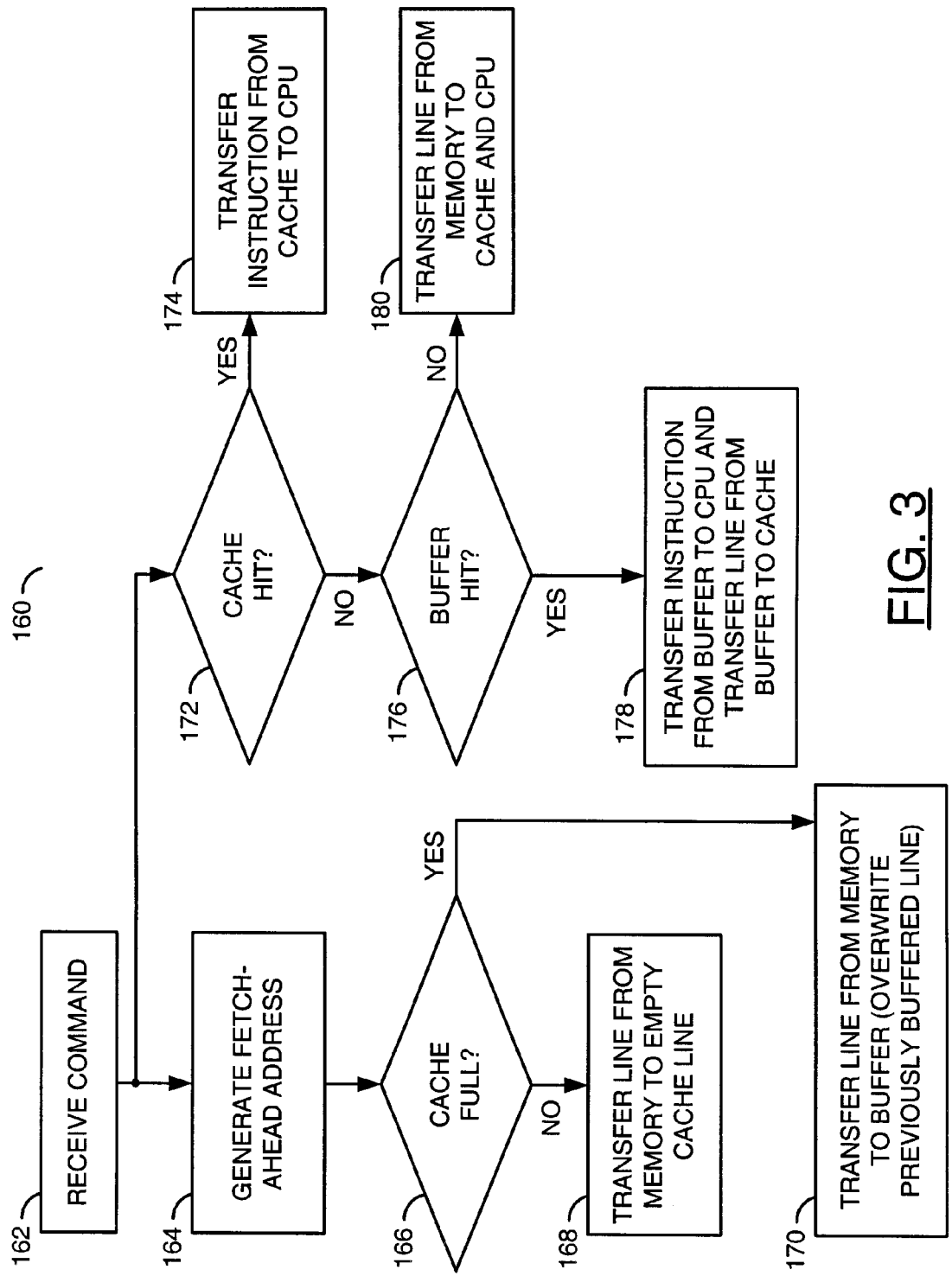
FIG. 3 is a flow diagram of an example implementation of a method of controlling instruction caching.

Referring to FIG. 3, a flow diagram of an example implementation of a method 160 of controlling instruction caching is shown. The method (or process) 160 may be implemented by the apparatus 100, and in particular, by the circuit 104a. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178 and a step (or block) 180.

In the step 162, the circuit 130a may receive a command from the circuit 102. The command may be a read command requesting an instruction from memory (e.g., the circuit 104a, the circuit 106 or the circuit 108). Other types of commands may be generated by the circuit 102 to meet the criteria of a particular application.

The circuit 130a may evaluate the command in the step 164 to determine if a fetch-ahead operation should be performed. If the circuit 130a determines that a fetch-ahead should be performed on a particular instruction line, the circuit 130a may examine a utilization of the circuit 106 in the step 166. If the circuit 106 is not full (e.g., the NO branch of step 166), the circuit 130a may conclude that the requested fetch-ahead instruction line may be safely copied from the circuit 108 to the circuit 106 without overwriting any existing information already stored in the circuit 106. Therefore, the circuit 130a may generate an appropriate address, read command and multiplex control in the signals ADDR2, READ2, CCTR and HITB respectively to cause a transfer of the particular instruction line from the circuit 108 to an empty cache line in the circuit 106 via the circuit 134.

If the circuit 106 is full (e.g., the YES branch of step 166), the circuit 130a may generate the signals ADDR2, READ2 and BCTR in the step 170 to cause a transfer of the newly-requested fetch-ahead instruction line from the circuit 108 to the circuit 132. If the circuit 132 was holding a previously transferred instruction line, the previous instruction line may be overwritten by the new instruction line. If the command type received by the circuit 130a is an instruction read type of command, the circuit 130a may proceed with a read operation.

In the step 172, the circuit 130a may initiate a check to determine if the requested instruction is already stored in the circuit 106. If a cache hit occurs because the requested instruction is currently stored in the circuit 106 (e.g., the YES branch of step 172), the circuit 130a may generate the signals CCTR and HITC in the step 174 to cause the requested instruction to be transferred from the circuit 106 through the circuit 136 to the circuit 102. If a cache miss occurs because the requested instruction is not currently stored in the circuit 106 (e.g., the NO branch of step 172), the circuit 130a may determine if the requested instruction is currently buffered in the circuit 132.

If a buffer hit occurs because the requested instruction is currently stored in the circuit 132 but not the circuit 106 (e.g., the YES branch of step 176), the circuit 130a may control transfer of the requested instruction from the circuit 132 to the circuit 102. In the step 178, the circuit 130a generally controls the signals BCTR, CCTR HITC and HITB to cause the requested instruction to be transferred (i) from the circuit 132 to the circuit 134 via the signal LINE3 and (ii) from the circuit 134 to both the circuit 136 and the circuit 106 via the signal LINE2. The circuit 136 may pass the requested instruction to the circuit 102. The circuit 106 may store the new instruction line.

If a buffer miss occurs because the requested instruction is not currently stored in the circuit 132 or the circuit 106 (e.g., the NO branch of step 176), the circuit 130a may command that an appropriate instruction line be copied from the circuit 108. In the step 180 the circuit 130a may control the signals ADD2, READ2, CCTR, HITB and HITC to cause a particular instruction line containing the requested instruction to be transferred (i) from the circuit 108 to the circuit 134 via the signal LINE1 and (ii) from the circuit 134 to both the circuit 136 and the circuit 106 via the signal LINE2. The circuit 136 may pass the requested instruction to the circuit 102. The circuit 106 may store the new instruction line. An old line stored in the circuit 132 may remain unchanged.

Figure 4:
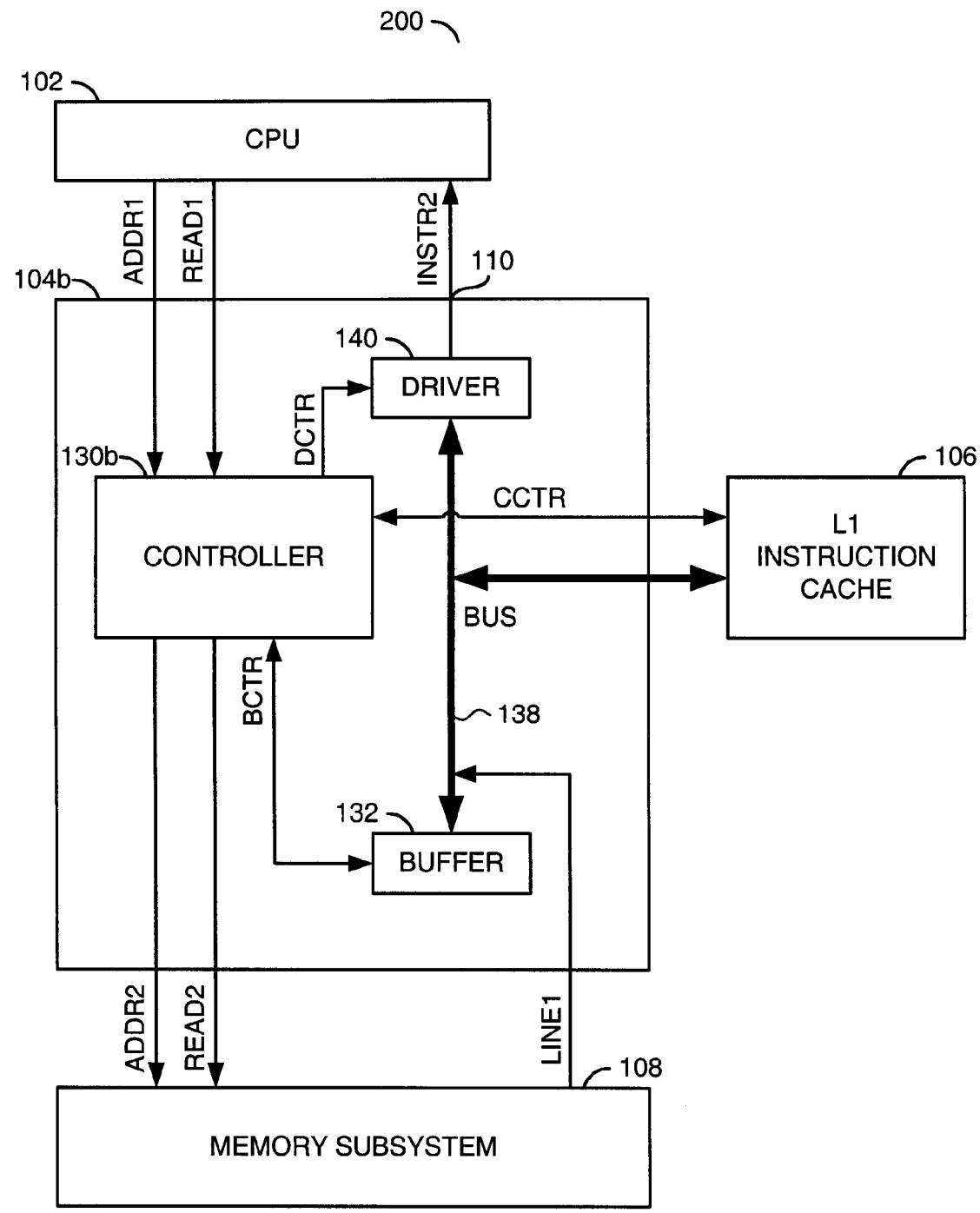
FIG. 4 is a block diagram of a second example implementation of the apparatus.

Referring to FIG. 4, a block diagram of a second example implementation of an apparatus 200 implementing the present invention is shown. The apparatus 200 may be operational to perform instruction cache buffering similar to the apparatus 100. The apparatus 200 generally comprises the circuit 102, a circuit (or module) 104b, the circuit 106 and the circuit 108. The circuit 104b generally comprises a circuit (or module) 130b, the circuit 132, a bus 138 and a circuit (of module) 140.

The circuit 102 may present the signals ADDR1 and READ1 to the circuit 130b. The circuit 130b may present the signals ADDR2 and READ2 to the circuit 106. The signal CCTR may be exchanged between the circuit 130b and the circuit 106. The circuit 130b may present a signal (e.g., DCTR) to the circuit 140. The circuit 108 may send instruction lines to the bus 138 via the signal INSTR1. The bus 138 may carry individual instructions and instruction lines (i) to and from the circuit 106, (ii) to and from the circuit 132 and (iii) to the circuit 140. Generally, the bus 138 transfers the requested instructions (i) from the circuit 106 to the circuit 140 on a cache hit, (ii) from the circuit 132 to the circuit 140 and the circuit 106 on a cache miss and buffer hit and (iii) from the circuit 108 to the circuit 140 and the circuit 106 on a cache miss and buffer miss. The circuit 140 may send the instructions to the circuit 102 via the signal INSTR2. The circuit 130b may exchange the signal BCTR with the circuit 132.

The circuit 104b may operate similarly to the circuit 104a with a few differences. For example, all instruction lines transfers received from the circuit 108 may presented on the bus 138. From the bus 138, the instruction lines may be transferred to one or more of the circuit 106, the circuit 132 and the circuit 140 concurrently. The destination of the new instruction line is generally based on (i) the availability of open cache lines in the circuit 106, (ii) a cache-miss upon a read command, (iii) a buffer miss upon a read command and (iv) a fetch-ahead operation initiated by either the circuit 130b or the circuit 102.

The circuit 140 may be implemented as a driver. The circuit 140 is generally operational to remove the requested instruction from the bus 138 and drive the signal INSTR2 at the port 110. Selection of the requested instruction may be controlled by the signal DCTR.

Under the present invention, a line fetched from the main memory by a fetch-ahead operation may be (i) stored in a buffer and (ii) copied to a cache only if an item within the buffered line is requested by a CPU. The buffer may be tentative, (i) if an instruction within the fetch-ahead line is requested, the entire buffered line is transferred from the buffer to the cache and (ii) if no instructions in the buffered line are requested, the buffered line may not be transferred to the cache thereby preventing pollution of the cache. In some embodiments, each buffered line may contain multiple instructions. In other embodiments, each buffered line may contain multiple data items.

In case of a new fetch-ahead operation while the buffer is full, the old line currently stored in the buffer may be overwritten by the newly fetched line. Fetching a new line while the buffer has an old line that was not copied to the cache generally indicates that the old line was not used by the CPU due to a change in a program flow. Although the fetch-ahead operation is speculative, the fetch-ahead line may not overwrite other cached lines before the fetch-ahead line is actually requested by the CPU.

The functions performed by the diagrams of FIGS. 2-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
 a cache configured to store a plurality of old lines, each of said old lines comprising a plurality of old instructions;
 a buffer (i) sized to hold a single line at a time and (ii) configured to store a first new line fetched-ahead from a memory in response to a first read command, said first new line comprising a plurality of new instructions;
 a first circuit (i) coupled unidirectionally to each of said buffer, said cache and said memory and (ii) configured to receive said first new line from said buffer in response to a second read command that identifies a particular one of said new instructions stored in said buffer;
 a second circuit (i) coupled unidirectionally to each of said first circuit, said cache and a processor and (ii) configured to (a) receive said first new line from said first circuit, (b) multiplex said first new line to select said particular new instruction in response to a control signal and (c) present said particular new instruction alone to said processor, wherein said cache is further configured to (i) receive said first new line from said first circuit and (ii) overwrite a particular one of said old lines with said first new line; and
 a third circuit configured to generate said control signal that identifies said particular new instruction in response to a cache miss and a buffer hit of said second read command.

2. The apparatus according to claim 1, wherein (i) said cache is further configured to present to said second circuit a particular one of said old instructions in response to a cache hit of a third read command among said old instructions and (ii) said second circuit is further configured to present said particular old instruction to said processor.

3. The apparatus according to claim 1, wherein said first circuit is further configured to (i) receive a second new line as read from said memory in response to a third read command and (ii) present said second new line to said cache in response to said cache not being full such that (a) said second new line resides in both said cache and said memory and (b) said first new line resides in both said buffer and said memory.

4. The apparatus according to claim 3, wherein said first circuit is further configured to (i) receive a third new line as read from said memory in response to a fourth read command and (ii) present said third new line to said buffer in response to said cache being full such that (a) said first new line resides only in said memory and (b) said third new line resides in both said buffer and said memory.

5. The apparatus according to claim 4, wherein said first circuit is further configured to (i) receive a fourth new line as read from said memory in response to both (a) a cache miss of a fifth read command and (b) a buffer miss of said fifth read command and (ii) present said fourth new line to said cache such that (1) said fourth new line resides in both said cache and said memory and (2) said third new line resides in both said buffer and said memory.

6. The apparatus according to claim 5, wherein said second circuit is further configured to (i) receive said fourth new line from said first circuit, (ii) multiplex a given instruction from said fourth new line and (iii) present said given instruction to said processor.

7. The apparatus according to claim 1, wherein said third circuit is further configured to control a write into said cache of a given one of said old lines as read directly from said memory in response to said cache having an empty line.

8. The apparatus according to claim 7, wherein said given old line is transferred from said memory to said cache without passing through said buffer.

9. The apparatus according to claim 1, wherein said first new line is presented from said first circuit to said second circuit without passing through said cache.

10. The apparatus according to claim 1, wherein (i) said cache comprises a level 1 instruction cache and (ii) said memory comprises a level 2 cache and a main memory.

11. A method of tentatively read buffering a cache, comprising the step of:
 (A) storing a plurality of old lines in said cache, each of said old lines comprising a plurality of old instructions;
 (B) storing a first new line fetched-ahead from a memory in a buffer in response to a first read command, said first new line comprising a plurality of new instructions, said buffer being sized to hold a single line at a time;

(C) presenting said first new line from said buffer to a first circuit in response to a second read command that identifies a particular one of said new instructions stored in said buffer, wherein said first circuit is coupled unidirectionally to each of said buffer, said cache and said memory;

(D) presenting said first new line from said first circuit to both said cache and a second circuit, wherein said second circuit is coupled unidirectionally to each of said first circuit, said cache and a processor;

(E) generating a control signal that identifies said particular new instruction in a third circuit in response to a cache miss and a buffer hit of said second read command;

(F) multiplexing said first new line with said second circuit to select said particular new instruction in response to said control signal;

(G) presenting said particular new instruction alone from said second circuit to said processor; and (H) overwriting a particular one of said old lines in said cache with said first new line.

12. The method according to claim 11, further comprising the steps of:
presenting from said cache to said second circuit a particular one of said old instructions in response to a cache hit of a third read command among said old instructions; and
presenting said particular old instruction from said second circuit to said processor.

13. The method according to claim 11, further comprising the steps of:
receiving at said first circuit a second new line as read from said memory in response to a third read command; and
presenting said second new line from said first circuit to said cache in response to said cache not being full such that (i) said second new line resides in both said cache and said memory and (ii) said first new line resides in both said buffer and said memory.

14. The method according to claim 13, further comprising the steps of:
receiving at said first circuit a third new line as read from said memory in response to a fourth read command; and
presenting said third new line to said buffer in response to said cache being full such that (i) said first new line resides only in said memory and (ii) said third new line resides in both said buffer and said memory.

15. The method according to claim 14, further comprising the steps of:
receiving at said first circuit a fourth new line as read from said memory in response to both (i) a cache miss of a fifth read command and (ii) a buffer miss of said fifth read command; and
presenting said fourth new line to said cache such that (a) said fourth new line resides in both said cache and said memory and (b) said third new line resides in both said buffer and said memory.

16. The method according to claim 15, further comprising the steps of:
presenting from said first to said second circuit said fourth new line in response to a fifth read command;
multiplexing a given instruction from said fourth new line using said second circuit; and
presenting said given instruction from said second circuit to said processor.

17. The method according to claim 11, further comprising the step of:
controlling with said third circuit a writing into said cache of a given one of said old lines as read directly from said memory in response to said cache having an empty line.

18. The method according to claim 17, wherein said given old line is transferred from said memory to said cache without passing through said buffer.

19. The method according to claim 11, wherein said first new line is presented from said first circuit to said second circuit without passing through said cache.

20. An apparatus comprising:
means for caching a plurality of old lines, each of said old lines comprising a plurality of old instructions; and
means for buffering (i) sized to hold a single line at a time and (ii) configured to store a first new line fetched-ahead from a memory in response to a first read command, said first new line comprising a plurality of new instructions;
means for transferring (i) coupled unidirectionally to each of said means for buffering, said means for caching and said memory and (ii) configured to receive said first new line from said means for buffering in response to a second read command that identifies a particular one of said new instructions stored in said buffer;
means for generating a control signal that identifies said particular new instruction in response to a cache miss and a buffer hit of said second read command; and
means for selecting (i) coupled unidirectionally to each of said means for transferring, said cache and a processor and (ii) configured to (a) receive said first new line from said means for transferring, (b) multiplex said first new line to select said particular new instruction in response to said control signal and (c) present said particular new instruction alone to said processor, wherein said means for caching is further configured to (i) receive said first new line from said means for transferring and (ii) overwrite a particular one of said old lines with said first new line.

* * * * *